United States Patent [19]

Howard et al.

[11] Patent Number: 4,866,563
[45] Date of Patent: Sep. 12, 1989

[54] TRANSIENT SUPPRESSOR DEVICE ASSEMBLY

[75] Inventors: Christopher-George Howard; Norma A. Doughty, both of Wiltshire, Great Britain

[73] Assignee: Semitron Cricklade, Ltd., United Kingdom

[21] Appl. No.: 215,301

[22] Filed: Jul. 5, 1988

[30] Foreign Application Priority Data

Sep. 24, 1987 [EP] European Pat. Off. ........ 87308446.1

[51] Int. Cl.[4] ...................... H02H 9/06; H01H 85/44
[52] U.S. Cl. .................................... 361/124; 361/126; 361/129; 337/32
[58] Field of Search .............. 361/111, 119, 117, 120, 361/124, 125, 126, 127, 128, 129; 337/32, 33

[56] References Cited

U.S. PATENT DOCUMENTS

| | | | |
|---|---|---|---|
| 4,062,054 | 12/1977 | Simokat | 361/124 |
| 4,212,047 | 7/1980 | Napiorkowski | 361/124 |
| 4,303,959 | 12/1981 | Roberts et al. | 361/119 |
| 4,326,231 | 4/1982 | Coren | 361/119 |
| 4,544,983 | 10/1985 | Anderson et al. | 361/119 |
| 4,642,723 | 2/1987 | Achtnig et al. | 361/124 |

Primary Examiner—A. D. Pellinen
Assistant Examiner—Howard L. Williams
Attorney, Agent, or Firm—Hill, Van Santen, Steadman & Simpson

[57] ABSTRACT

A transient suppressor device assembly having at least two electrical components and a fail-safe clip. The fail-safe clip has means for simultaneously providing the necessary electrical conductive paths, providing fail-safe operation if an electrical component becomes overheated and holding together the electrical components.

2 Claims, 6 Drawing Sheets

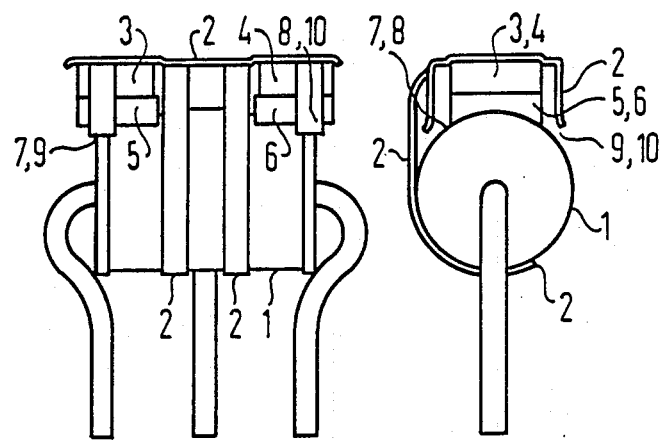
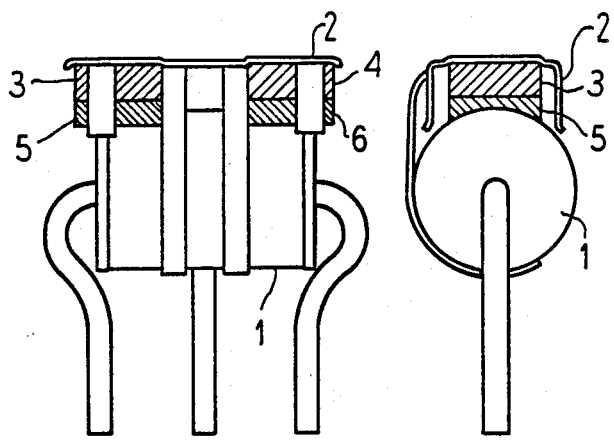

TRANSIENT SUPPRESSOR DEVICE ASSEMBLY

BACKGROUND OF THE INVENTION

This invention relates to a transient suppressor device assembly.

Transient suppressor device assemblies are known, for example, from European Patent Application No. EP-A-O 123 126. Telecommunication systems are commonly protected from transient voltage surges, such as those resulting from lightning, by gas discharge tubes (G.D.T.). FIG. 1 shows a typical configuration where a three terminal device G.D.T. is placed between two telephone lines, A and B and earth. Frequently main distribution frame systems are provided with one three-terminal G.D.T. for each pair of lines.

The G.D.T. has massive current carrying capability but it has three major disadvantages. The first disadvantage is that the device is not fail-safe in the event of overheating. The occurrence of a continuous high current such as might result from a mains contact of the system, causes excessive heating and serious damage to the main distribution frame. Over-temperature fail-safe devices are known from patent disclosures Nos. DE-A 29 11 110, EP-A-O 040 522, and EP-A-O 134 718, for example. Secondly, degradation of the parameters of the G.D.T. cannot be detected. It is possible for the DC spark-over voltage of the device to increase progressively due to a lack of device hermeticity. This problem is solved by the present invention. Thirdly, the device is relatively slow in its operation. The increasing use of semiconductor devices in telecommunication applications has led to situations where the G.D.T. cannot give adequate protection. Semiconductor devices are extremely sensitive to overvoltage conditions and can be destroyed by voltage surges of less than a nanosecond. Semiconductor protection devices have been developed with faster response times than this, which solve the overvoltage problem, but are unable to cope with the large currents (of the order of 5 KA) which protection devices are expected to carry. The present invention provides a small transient suppression device of similar size to a G.D.T., which has fast response and high current carrying capability.

SUMMARY OF THE INVENTION

FIG. 2 shows a G.D.T. having two bidirectional avalanche diodes D1, D2 and thermal cut-outs T1, T2. The thermal cut-outs T1, T1 ensure that the unit fails short-circuit in the event of its overheating. The short-circuit function is carried out by a spring loaded contact which is released by the melting of a solder slug as in patent disclosure No. DE-A-2911110. The bidirectional diodes D1, D2 either provide protection against an increase in G.D.T. spark-over voltage or protect electronic components against rapidly rising transient pulses or protect against both effects. Protection against an increase in G.D.T. spark-over voltage can be achieved by selecting diodes which have breakdown voltages considerably above those of the DC spark-over voltage of the G.D.T. and which have very low power ratings. They normally take no part in the operation of the device. However, if the spark-over voltage of the G.D.T. increases, for instance as a result of gas leakage from the capsule, the diodes then provide the fail-safe characteristic. A progressive degradation of G.D.T. parameters will lead first to the diodes clamping during surges and then to their ratings being exceeded and the diodes failing short-circuit.

The G.D.T. will not respond fast enough to a rapidly rising pulse (e.g. the CCITT 5 KV lightning test with 10 $\mu$sec rise time). While the G.D.T. may be rated in terms of DC spark-over voltage, a response time of the order of 1 microsecond can allow a large excess voltage to develop before the device switches. Voltages in excess of 700 V can appear across the terminals of a nominal 250 volt G.D.T. when this test is carried out. FIG. 3 shows an oscilloscope trace of this test, which was carried out on a T83-C250GB G.D.T. manufactured by Siemens. Protection against fast-rising transient pulses can be obtained by using the circuit in FIG. 2 with high power transient suppression avalanche diodes. The avalanche diodes are selected to have a greater breakdown voltage than the DC spark-over voltage of the G.D.T. and to be capable of handling the power dissipated in them prior to the switching on of the G.D.T. They must also not exceed the clamp voltage at this stage. Once the G.D.T. has triggered, the voltage across the diodes falls below their breakdown voltage and they turn off. The system then behaves as a G.D.T. alone.

A transient suppressor device assembly according to the present invention with a circuit design as in FIG. 2, provides improved fail-safe operation, prevents the main distribution frame from excessive heating and serious damage, provides a small transient suppression device which can be easily, speedily and cheaply manufactured and provides a device which is robust and has reliable properties. The parameters of the avalanche diodes can be selected so that the unit is protected against increases in G.D.T. spark-over voltage or so that the unit provides protection against transient pulses with fast rise times. In principle, it may be possible to select diodes which carry out both functions simultaneously.

The electrical components of the transient suppressor device assembly are held in close thermal contact so that these electrical components are never permitted to overheat (see European Patent Application No. 8530 6408.7).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIGS. 5 and 6 show a transient suppressor device assembly according to the present invention;

FIGS. 7 through 12 show a first assembly embodiment; and

DESCRIPTION OF THE PREFERRED EMBODIMENT

Figure 1:
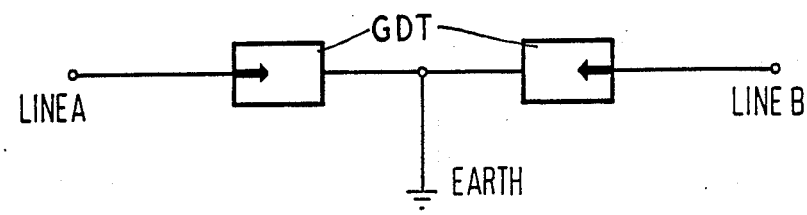
FIG. 1 shows a prior art transient suppressor device.
Figure 2:
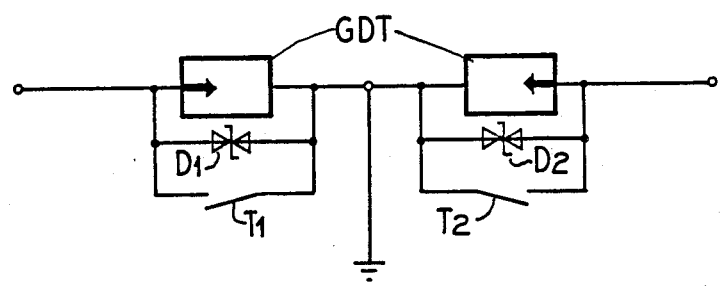
FIG. 2 illustrates the principle of a transient suppressor device assembly according to the present invention.
Figure 3:
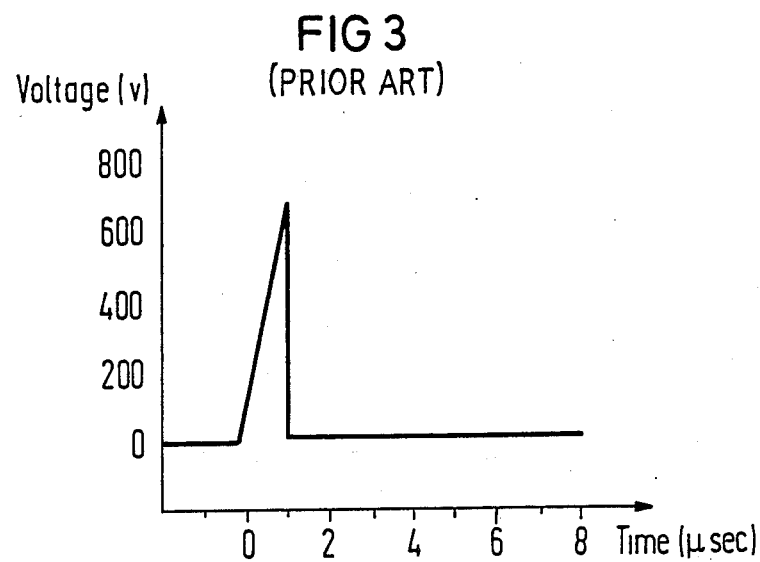
FIGS. 3 and 4 show oscilloscope traces illustrating the responses of devices of FIGS. 1 and 2 to rapidly rising pulses.

In a first functional embodiment of the present invention, the avalanche diodes D1 and D2 in FIG. 2 are selected to give protection against an increase in G.D.T. breakdown voltage. The circuit has a G.D.T. having a DC spark-over voltage in the range of 280–420 volts, and 1 watt diodes having breakdown voltages in the range of 500–800 volts. The unit is intended to clamp at voltages below 1000 volts on a standard CCITT 5 KA pulse with 8 μsec rise time and a time to half current decay of 20 μsec. The presence of the diodes D1 and D2 ensures that this clamp voltage is never exceeded, even in the event of an open circuit G.D.T. device. Should the G.D.T. go open circuit, the large current through a diode would cause it to short-circuit.

Figure 4:
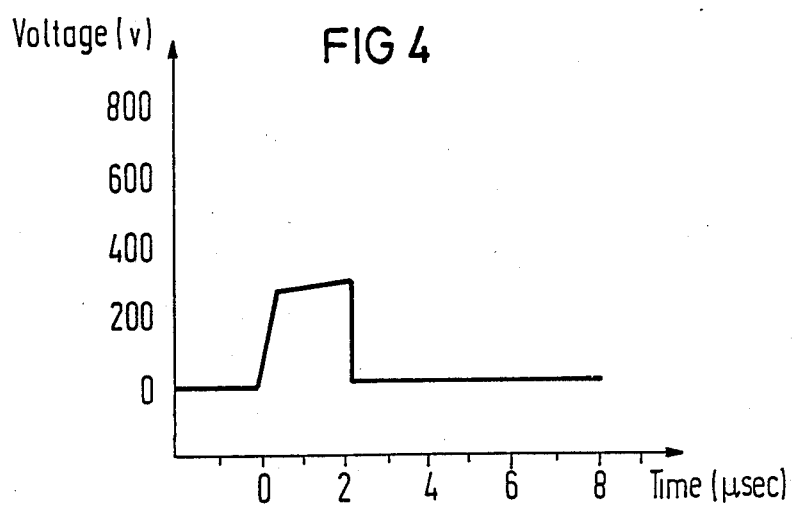

In a second functional embodiment of the present invention, the avalanche diodes D1 and D2 of the circuit in FIG. 2 are selected to protect electronic components against rapidly rising pulses. FIG. 4 shows an oscilloscope trace of the CCITT 5 KV lightning test with a 10 μsec rise time. The G.D.T. used for these measurements was type T83-C250GB manufactured by Siemens and had Semitron diodes type L8B280C which break down at 280 volts ±5%. Typical measured G.D.T. DC breakdown voltages were 240 volts.

These aforementioned principles have been incorporated in the design of the Semitron SL22A series of surge suppressors, depicted in FIG. 5. A standard three terminal G.D.T. 1 is fitted with a spring clip 2. This positions cylindrical avalanche diode chip assemblies 3 and 4 and solder pellets 5 and 6.

If, during an overload the solder pellets 5 or 6 melt, the spring 2 moves so that it contacts the G.D.T. electrode at 7, 8, 9 or 10, shorting the G.D.T. terminals. The diode chip assemblies 3 and 4 consist of passivated silicon chips sandwiched between two protective electrodes.

Figure 9:
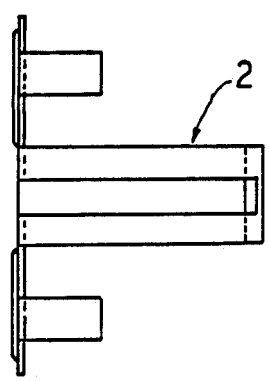
Figure 10:
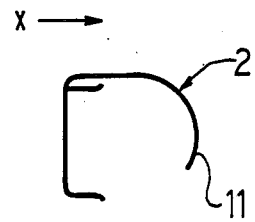
Figure 11:
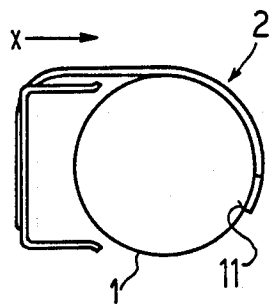
Figure 12:
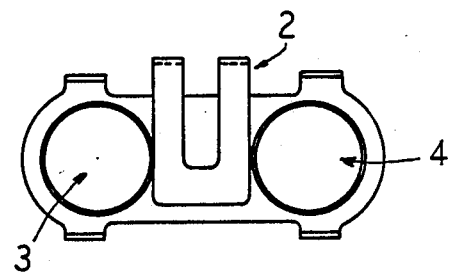

FIGS. 7 and 8 show one assembly embodiment of the transient suppressor device assembly of FIGS. 5 and 6. FIGS. 9, 11 and 12 show the clip 2 of FIGS. 5 to 8 in its operating position under tension. The clip 2 should be under tension of approximately 1.5 lbs in the X direction (FIG. 11). FIG. 10 shows the clip 2 of FIGS. 5 to 8 in the relaxed state. The clip 2 may consist of stainless steel or of a beryllium-copper alloy. A comparison between FIGS. 10 and 11 shows how part 11 of clip 2 moves from the operating position of FIG. 11 to the relaxed state profile of FIG. 10.

Figures 13, 14:
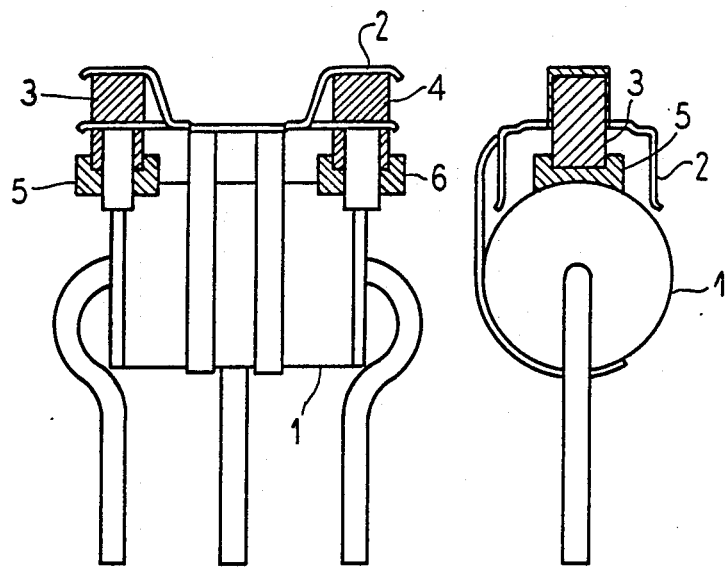
FIGS. 13 through 18 show a second assembly embodiment.
Figure 15:
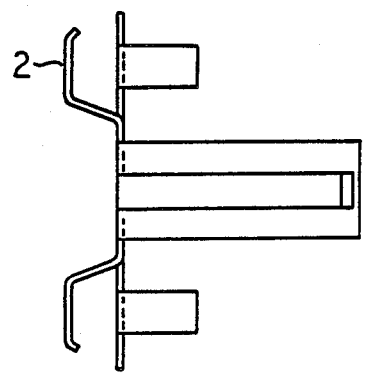
Figure 16:
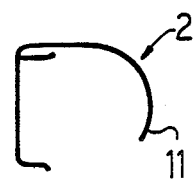
Figure 17:
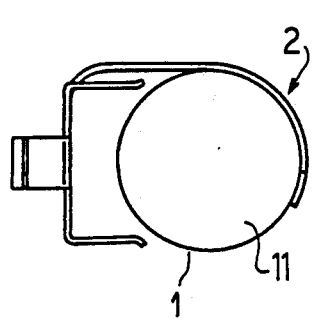
Figure 18:
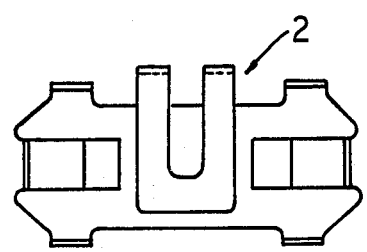

FIGS. 13 and 14 show sections of another assembly embodiment of a transient suppressor device assembly corresponding to FIGS. 7 and 8. Only the geometry of the diodes 3, 4 is changed and the clip 2 is modified accordingly. FIGS. 15 to 18 show details of a clip 2 of FIGS. 13 and 14. FIGS. 15, 17 and 18 show the clip 2 of FIGS. 13 and 14 in its operating position under tension. FIG. 16 shows the clip 2 of FIGS. 13 and 14 in the relaxed state. FIGS. 15 to 18 correspond to FIGS. 9 to 12.

The specification of the diodes 3, 4 depends on which functional embodiment of the invention is being made. They are selected to provide protection against an increase in G.D.T. spark-over voltage or to give protection against rapidly rising pulses or to carry out both functions. If the power dissipated in the diodes 3, 4 exceeds their rating, they will short-circuit, ensuring fail-safe operation of the unit.

The four functions of the clip 2 are:

(1) The clip 2 is the fundamental assembly element. No other components, solders or glues are required to complete the assembly of the electronic components and the over-temperature protection solder forms the finished transient suppressor device assembly.

(2) The clip 2 provides the necessary electrical conductive paths between the components of the unit.

(3) The clip 2 allows the components of the unit to be thermally connected.

(4) The clip 2, in conjunction with the over-temperature protection solder, is able to provide fail-safe operation if any part of the unit becomes overheated.

The use of one single component, clip 2, to carry out all these functions is unique.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A transient suppressor device assembly comprising:
    a gas discharge tube having first, second and third terminals;
    first and second diodes;
    first and second solder slugs located between and electrically connecting one terminal of said first and second diodes to said first and third terminals of said gas discharge tube, respectively;
    a fail-safe resilient clip contacting said second terminal of said gas discharge tube and also contacting the other terminal of said first and second diodes said fail-safe resilient clip holding together said gas discharge tube, said first and second diodes and said first and second solder plugs, said fail-safe clip engaging at least one of said first and third terminals of said gas discharge tube when a respective solder slug melts due to overheating.

2. The transient suppressor device assembly according to claim 1, wherein the fail-safe clip consists of a beryllium-copper alloy.

* * * * *